United States Patent
Ikeda

(10) Patent No.: US 12,389,436 B2
(45) Date of Patent: Aug. 12, 2025

(54) COMMUNICATION APPARATUS, CONTROL METHOD, AND COMPUTER-READABLE STORAGE MEDIUM

(71) Applicant: CANON KABUSHIKI KAISHA, Tokyo (JP)

(72) Inventor: Nobuhiro Ikeda, Kanagawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 378 days.

(21) Appl. No.: 17/886,642

(22) Filed: Aug. 12, 2022

(65) Prior Publication Data
US 2022/0386321 A1 Dec. 1, 2022

Related U.S. Application Data

(63) Continuation of application No. PCT/JP2021/009591, filed on Mar. 10, 2021.

(30) Foreign Application Priority Data

Mar. 12, 2020 (JP) .................................. 2020-043334

(51) Int. Cl.
*H04W 72/54* (2023.01)
*H04W 72/20* (2023.01)

(52) U.S. Cl.
CPC ........... *H04W 72/54* (2023.01); *H04W 72/20* (2023.01)

(58) Field of Classification Search
CPC ..... H04W 72/54; H04W 72/20; H04W 72/12; H04W 74/02; H04W 74/0816; H04W 74/002; H04W 84/12
See application file for complete search history.

(56) References Cited

U.S. PATENT DOCUMENTS

| 10,021,646 B2 | 7/2018 | Takahashi et al. |
| 10,278,128 B2 | 4/2019 | Takahashi et al. |
| 2018/0332534 A1* | 11/2018 | Hou ................. H04W 52/0229 |
| 2019/0090220 A1 | 3/2019 | Li et al. |
| 2021/0329500 A1* | 10/2021 | Cariou ............... H04W 74/002 |

(Continued)

FOREIGN PATENT DOCUMENTS

| CN | 105009491 A | 10/2015 |
| EP | 3166257 A1 | 5/2017 |

(Continued)

OTHER PUBLICATIONS

Yang, W. et al., "Survey on IETF 6TiSCH Industrial Internet of Things: Standards, Key Technologies and Platforms" Journal of Frontiers of Computer Science and Technology (Dec. 2019) pp. 361-376, vol. 14, No. 3.

(Continued)

*Primary Examiner* — Ayaz R Sheikh
*Assistant Examiner* — Mang Boi Thawng
(74) *Attorney, Agent, or Firm* — Carter, DeLuca & Farrell LLP

(57) ABSTRACT

A communication apparatus transmits a radio frame complying with an IEEE802.11 standard series to another communication apparatus, or receives the radio frame from the other communication apparatus. Here, a MAC (Media Access Control) frame of the radio frame includes information concerning scheduling of transmission opportunities in which contention is restricted based on a time.

12 Claims, 13 Drawing Sheets

(56) References Cited

U.S. PATENT DOCUMENTS

| | | | |
|---|---|---|---|
| 2022/0346149 A1 | 10/2022 | Ikeda | |
| 2023/0022414 A1* | 1/2023 | Kim | H04L 1/1896 |
| 2023/0180208 A1* | 6/2023 | Cavalcanti | H04W 72/0446 |
| | | | 370/329 |
| 2024/0015780 A1* | 1/2024 | Dong | H04W 74/002 |

FOREIGN PATENT DOCUMENTS

| | | |
|---|---|---|
| JP | 2018-050133 A | 3/2018 |
| JP | 2018-207308 A | 12/2018 |
| WO | 2020/013874 A1 | 1/2020 |

OTHER PUBLICATIONS

Chinese Office Action issued by the China National Intellectual Property Administration on Aug. 29, 2024 in corresponding CN Patent Application No. 202180019870.1 with English translation.

Nasrallah, A. et al., "Ultra-Low Latency (ULL) Networks: A Comprehensive Survey Covering the IEEE TSN Standard and Related ULL Research" arXiv:1803.07673v1 (Mar. 2018) pp. 1-59, XP080861399.

Cavalcanti, D. et al., "Extending Accurate Time Distribution and Timeliness Capabilities Over the Air to Enable Future Wireless Industrial Automation Systems" Proceedings of the IEEE (Jun. 2019) pp. 1132-1152, vol. 107, No. 6, XP011725970.

Extended European Search Report issued by the European Patent Office on Feb. 14, 2024 in corresponding EP Patent Application No. 21768937.1.

International Search Report issued by the Japan Patent Office on Jun. 8, 2021 in corresponding International Application No. PCT/JP2021/009591, with English translation.

Cavalcanti, D. et al., "Capabilities to support Time-Aware Scheduling in 802_11be", IEEE 802.22-19/1933rl, IEEE, Internet <URL: https://mentor.ieee.org/802.11/dcn/19/11-19-1933-01-00be-capabilities-to-support-time-aware-scheduling-in-802-11be.pptx> (Nov. 2019) pp. 12-17.

\* cited by examiner

FIG. 11

| D BIT VALUE | CONTENT TAS SUPPORT |
|---|---|
| 00 | UNSUPPORTED/UNAVAILABLE |
| 01 | SHAPING SCHEME |
| 10 | POLICING SCHEME |
| 11 | BOTH SCHEMES (SHAPING/POLICING) |

FIG. 12

| E BIT VALUE | AVAILABILITY/TYPE CONTENTS (D BIT VALUE) |
|---|---|
| 1 | USABLE (D=01/10)/POLICING SCHEME (D=11) |
| 0 | UNUSABLE (D=01/10)/SHAPING SCHEME (D=11) |

COMMUNICATION APPARATUS, CONTROL METHOD, AND COMPUTER-READABLE STORAGE MEDIUM

CROSS-REFERENCE TO RELATED APPLICATIONS

This application is a Continuation of International Patent Application No. PCT/JP2021/009591, filed Mar. 10, 2021, which claims the benefit of Japanese Patent Application No. 2020-043334 filed Mar. 12, 2020, both of which are hereby incorporated by reference herein in their entirety.

BACKGROUND OF THE INVENTION

Field of the Invention

The present invention relates to a communication apparatus, a control method, and a computer-readable storage medium and, more particularly, to an information sharing technique for a scheduling function in wireless communication.

Background Art

The IEEE802.11 standard series is known as the communication standard of a wireless LAN (Local Area Network) defined by IEEE (Institute of Electrical and Electronics Engineers). The IEEE802.11 standard series includes IEEE 802.11a/b/g/n/ac/ax standards, and there has been examined a new standard to improve the peak throughput and frequency use efficiency, as compared with the conventional standards. In, for example, the IEEE802.11ax standard, it is possible to obtain high peak throughput using OFDMA (Orthogonal Frequency Division Multiple Access) (see Japanese Patent Laid-Open No. 2018-050133).

In recent years, to further improve the throughput and the frequency use efficiency, an IEEE802.11be standard has been defined as a new standard. One target for this working is to implement reliable low-latency (RLL) communication.

The present invention provides a communication control technique for implementing such reliable low-latency communication.

SUMMARY OF THE INVENTION

A communication apparatus according to one aspect of the present invention is a communication apparatus comprising a communication unit configured to transmit a radio frame complying with an IEEE802.11 standard series to another communication apparatus, or receive the radio frame from the other communication apparatus, wherein a MAC (Media Access Control) frame of the radio frame includes information concerning scheduling of transmission opportunities in which contention is restricted based on a time.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 11 is a table for explaining the setting values of the TAS capability information.

FIG. 12 is a table for explaining the setting values of the TAS capability information.

DESCRIPTION OF THE EMBODIMENTS

Figure 1:
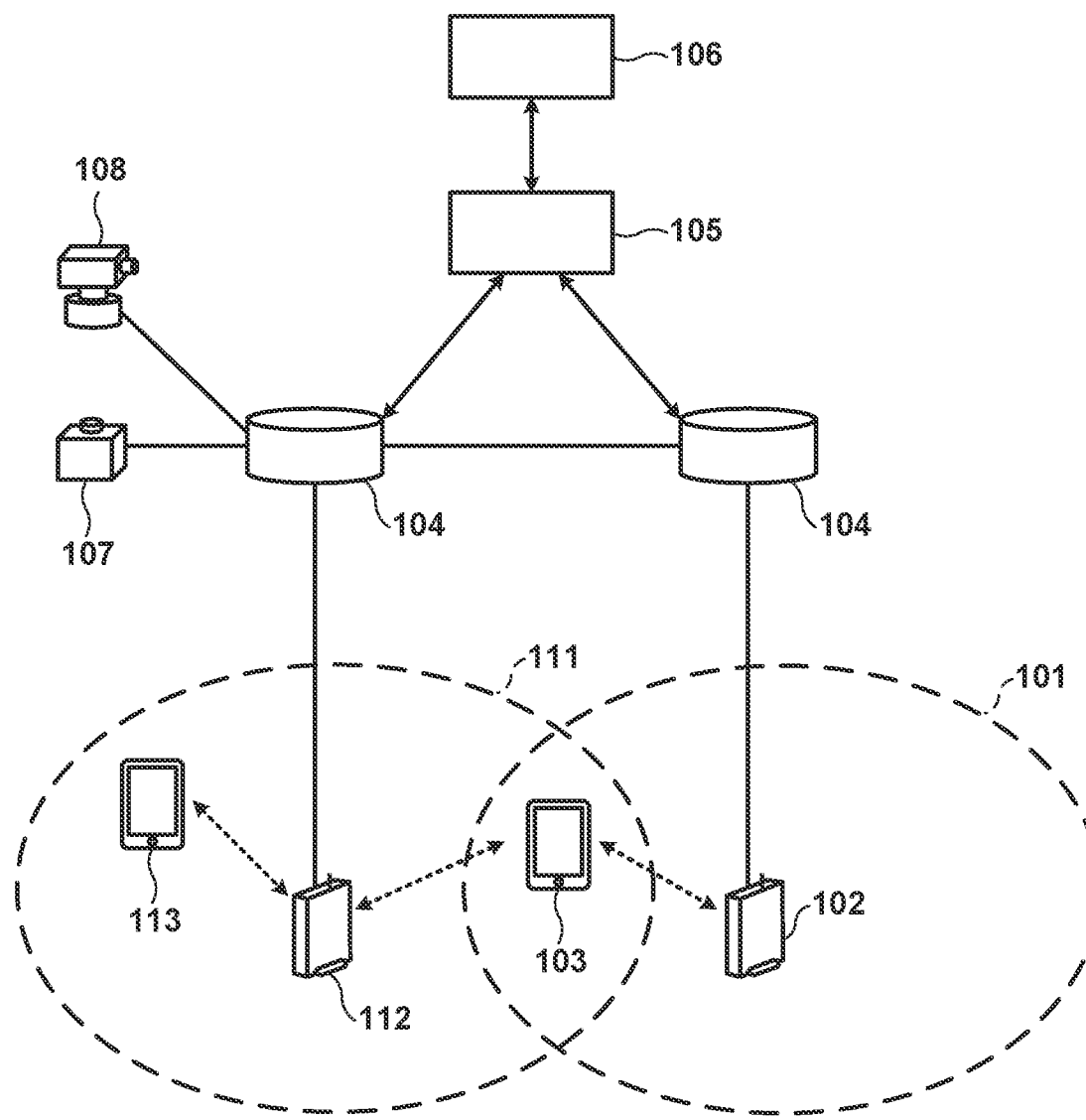
FIG. 1 is a view showing an example of the configuration of a network according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

(Network Configuration)

FIG. 1 shows an example of the configuration of a network according to an embodiment. As parts of the network of FIG. 1, a wireless communication network (BSS 101) in which an AP 102 provides a wireless communication service and a wireless communication network (BSS 111) in which an AP 112 provides a wireless communication service are included. Note that the AP is an acronym for Access Point, and the BSS is an acronym for Basic Service Set. A wireless terminal (STA) can be connected to the AP that provides a communicable area including a position at which the self-apparatus exists, thereby joining a BSS provided by the AP. The STA can perform transmission/reception of a radio frame in the joined network. In the example shown in FIG. 1, since an STA 103 exists in both the communicable areas of the APs 102 and 112, it can be connected to one of the APs to join one of the BSSs 101 and 111. Note that an environment where the communicable areas of a plurality of APs overlap each other will sometimes be referred to as an OBSS environment hereinafter. That is, in this embodiment, the STA 103 exists in the OBSS environment. Note that the STA 103 is connected to the AP 102, and a signal from the AP 112 can be an interference signal for the STA 103. Furthermore, since an STA 113 exists in the communicable area of the AP 112, it can be connected to the AP 112 to join the BSS 111.

The APs 102 and 112 are connected by bridges 104. The AP and the bridge or the bridge and the other bridge can be connected by, for example, a wired line. However, in at least part of the connection section between the APs 102 and 112, a wireless line may be used. This arrangement can form one network by merging the wireless networks formed by the APs 102 and 112 and the wired networks formed by the bridges 104 and the like.

A sensor apparatus 107 is a sensor connected to the network via the bridge 104, and is configured to, for example, output environment data collected by a sensor function to another apparatus. In this embodiment, the sensor apparatus 107 transmits the collected data to the STA 103 at a predetermined cycle. A remote apparatus 108 is a device that is connected to the network via the bridge 104 and operates in accordance with a remote operation instruction from another apparatus. The remote apparatus 108 is an end device such as a industrial robot or a medical operating robot that requires low-latency data communication by an RTA (Real Time Application). This embodiment assumes that the remote apparatus 108 operates in accordance with a remote operation instruction from the STA 103.

In this network system, for example, it is important that the STA 103 can reliably receive the data from the sensor apparatus 107 at the predetermined cycle, and a remote operation instruction signal from the STA 103 reaches the remote apparatus 108 with low latency. However, in the conventional wireless LAN, since an apparatus for transmitting data confirms that no radio resources are used in the periphery and transmits a signal during a period in which no radio resources are used, the apparatus cannot perform communication while another apparatus uses the radio resources. Therefore, to ensure transmission/reception of a signal at the predetermined cycle and enable communication with low latency, it is necessary to introduce some communication control function. As one solution for this, a Time-Aware Scheduling (TAS) scheme defined by the IEEE802.1Qbv standard for making it possible to appropriately execute transmission/reception of predetermined data such as data having a strict latency requirement can be introduced. The TAS scheme is a time-aware scheduling scheme for causing transmission/reception of a signal at a predetermined time with reference to the time. In this embodiment, in the network, communication adopting the TAS scheme is performed, thereby appropriately executing communication at the predetermined cycle or low-latency communication. To do this, assume that the respective apparatuses such as the AP 102, the STAs 103 and 113, and the bridge 104 support the TAS scheme. However, assume that the AP 112 does not support the TAS scheme. Note that the apparatuses other than the AP 112 further support the standard (IEEE802.1AS) synchronized with the same reference clock in the network.

Predetermined data transmitted/received by scheduling using the TAS scheme will be referred to as TAS traffic data hereinafter. In this example, TAS traffic data are packet data transmitted/received in consideration of latency control between the end devices. To control such transmission/reception, the network includes a network management apparatus 105 and a schedule management apparatus 106.

The network management apparatus 105 executes latency control concerning TAS traffic data. The schedule management apparatus 106 performs schedule management concerning the TAS traffic of the end device in the network that uses TAS traffic data. The AP 102 transmits/receives data to/from the network management apparatus 105 via the bridge 104. Furthermore, the AP 102 exchanges TAS information with the schedule management apparatus 106 that performs schedule management of the whole network.

The network management apparatus 105 collects requirements concerning time-aware scheduling (TAS) from the end devices such as the STA 103, the sensor apparatus 107, and the remote apparatus 108. Based on the requirements, for example, specific apparatuses that transmit/receive the TAS traffic data, a time interval at which the data is transmitted, the magnitude of allowed latency, and the like are designated. The network management apparatus 105 detects the network topology of the network to be controlled by the self-apparatus. The network topology can be a relationship indicating a specific apparatus to which each apparatus in the network is connected. Note that "connected" indicates a state in which the apparatuses are physically, directly connected or a state in which a logical link is established regardless of a physical connection arrangement. Based on the collected requirements, the network management apparatus 105 calculates, for each of transmission and reception of the TAS traffic data to be executed, an end-to-end path between the end devices. Then, the network management apparatus 105 performs scheduling by determining, based on the calculation result, a timing at which each apparatus transmits a signal, thereby notifying the schedule management apparatus 106 of the scheduling result.

The schedule management apparatus 106 transmits a message including the TAS information to the bridge 104 and the AP 102, thereby setting a transmission/reception schedule. The schedule management apparatus 106 also notifies the end devices (the STA 103, the sensor apparatus 107, and the remote apparatus 108) of the TAS information. At this time, each of the end devices (the STA 103, the sensor apparatus 107, and the remote apparatus 108) operates as a talker (data transmission side) or a listener (data reception side) in accordance with the transmission schedule concerning the TAS traffic in the network. For example, in a combination of the end devices considering the RTA traffic of the STA 103 and the sensor apparatus 107, the STA 103 operates as a listener and the sensor apparatus 107 operates as a talker. Details of the message sequence in this case will be described later with reference to FIG. 7, as an example of the flow of downlink (DL) communication of data communication supporting TAS in the BSS 101. In a combination of the end devices considering the RTA traffic of the STA 103 and the remote apparatus 108, the remote apparatus 108 operates as a listener and the STA 103 operates as a talker. Details of the message sequence in this case will be described later with reference to FIG. 8, as an example of the flow of uplink (UL) communication of data communication supporting TAS in the BSS 101.

Note that the above-described configuration of the network is merely an example, and the present invention is not limited to the configuration shown in FIG. 1. For example, the following discussion is applicable to, for example, a network (BSS) including many wireless communication apparatuses in a wider region, or the positional relationship between various wireless communication apparatuses. In addition, for example, the schedule management apparatus 106 sets a transmission/reception schedule. However, the function of the schedule management apparatus 106 may be included in a network node such as the AP 102, or may be included in the STA 103 in some cases. That is, the AP 102 and the STA 103 may determine the transmission/reception schedule of data frames.

Figure 15:
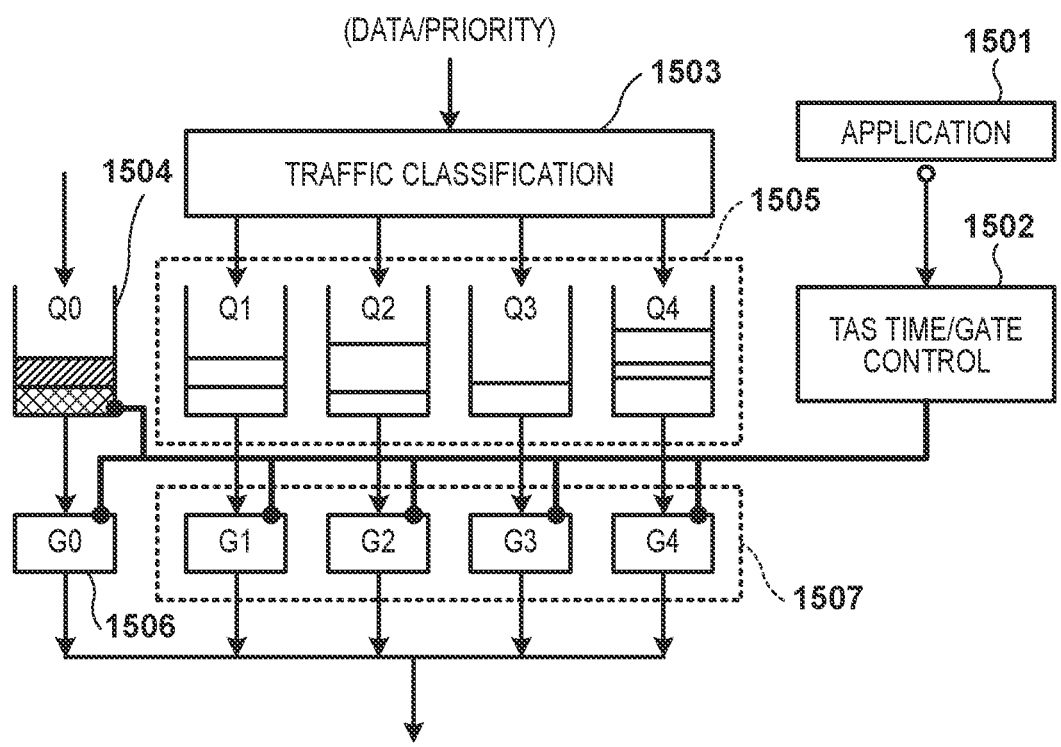
FIG. 15 is a view for explaining TAS traffic processing.
Figure 16:
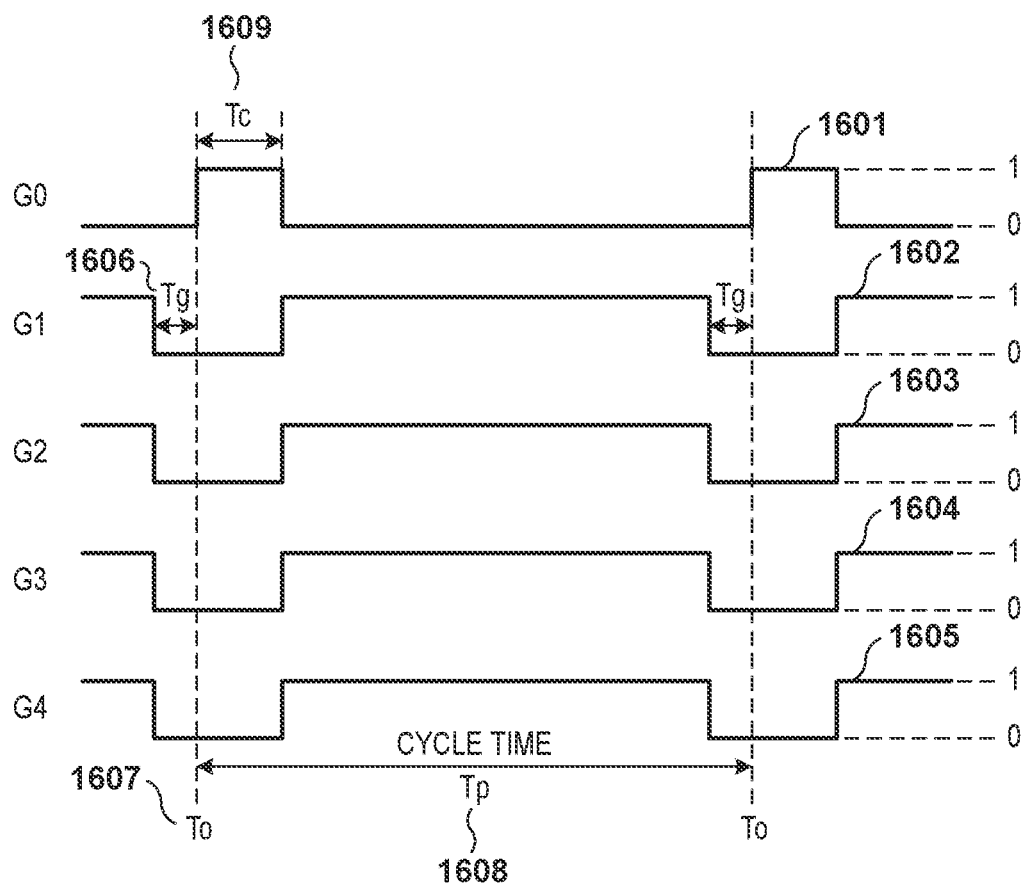
FIG. 16 is a timing chart for explaining TAS traffic processing.

As will be described later with reference to FIGS. 15 and 16, the apparatuses supporting the TAS scheme can transmit/receive TAS traffic data at a strict timing. Therefore, by setting an appropriate communication timing, it is possible to perform communication in a low-latency environment that is reliable, in some cases, such that there is no interference from another apparatus. On the other hand, it is also assumed that a communication apparatus supporting no TAS scheme exists in the area of the network, as a matter of course. Even if the schedule management apparatus 106 transmits a TAS scheme control message to the communication apparatus supporting no TAS scheme, the communication apparatus cannot interpret the message. This may cause the inconvenience of, for example, performing an unexpected operation.

This embodiment provides, on that assumption, a method of making a notification of capability information of each communication apparatus to make it possible to confirm whether each communication apparatus supports the TAS scheme. More specifically, a notification of information is made by adding an information element to a MAC (Media Access Control) header of a radio frame to be transmitted by each communication apparatus. By selecting, based on the pieces of information, whether to use scheduling by the TAS scheme, it is possible to perform appropriate scheduling between a transmission apparatus and a reception apparatus. The arrangements of the apparatuses that transmit/receive such notification, the procedure of processing, and the practical structure of the frame will be exemplified below.
(Apparatus Arrangement)

Figure 2:
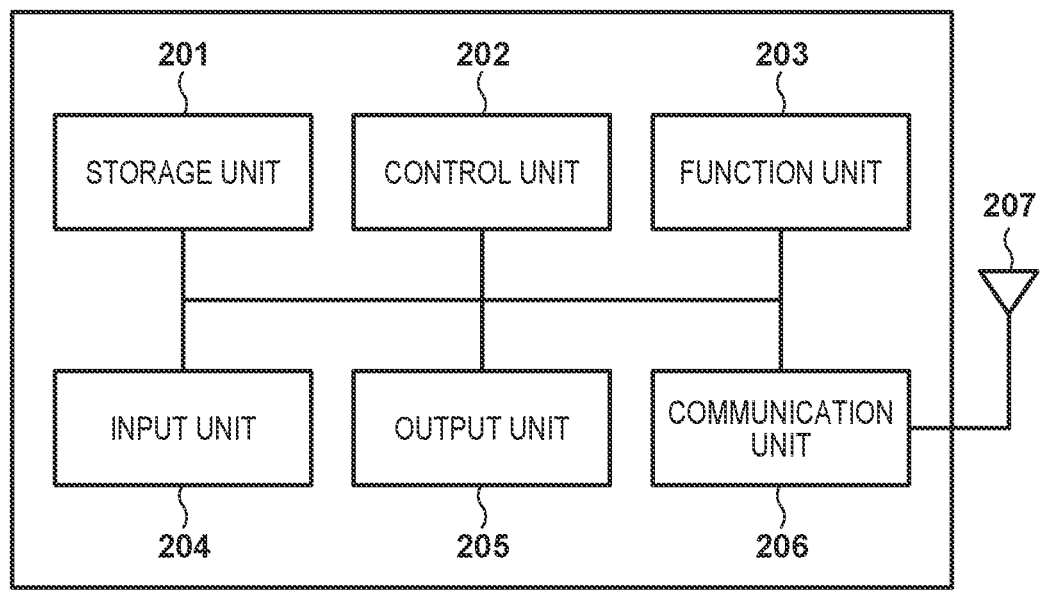
FIG. 2 is a block diagram showing an example of the hardware arrangement of a communication apparatus.

FIG. 2 shows the hardware arrangement of the communication apparatus (the AP, the STA, and other end devices) according to this embodiment. The communication apparatus includes, as an example of the hardware arrangement, a storage unit 201, a control unit 202, a function unit 203, an input unit 204, an output unit 205, a communication unit 206, and an antenna 207.

The storage unit 201 is formed by both or either of a ROM (Read Only Memory) and a RAM (Random Access Memory). The storage unit 201 stores, for example, programs for performing various operations (to be described later) and various kinds of information such as communication parameters for wireless communication. Note that a storage medium such as a flexible disk, a hard disk, an optical disk, a magnetooptical disk, a CD-ROM, a CD-R, a magnetic tape, a nonvolatile memory card, or a DVD may be used as the storage unit 201, other than memories such as a ROM and a RAM.

The control unit 202 is formed by one or more processors, for example, a processor such as a CPU or an MPU, an ASIC (Application Specific Integrated Circuit), a DSP (Digital Signal Processor), an FPGA (Field Programmable Gate Array), and the like. The CPU is an acronym for Central Processing Unit, and the MPU is an acronym for Micro Processing Unit. The control unit 202 controls the overall communication apparatus by executing the programs stored in the storage unit 201. Note that the control unit 202 may control the overall communication apparatus in cooperation with the programs stored in the storage unit 201 and an OS (Operation System).

The control unit 202 controls the function unit 203 to execute predetermined processing such as image capturing, printing, or projection. The function unit 203 is hardware used by the communication apparatus to execute predetermined processing. For example, in a case in which the communication apparatus is a camera, the function unit 203 is an image capturing unit and performs image capturing processing. For example, in a case in which the communication apparatus is a printer, the function unit 203 is a printing unit and performs print processing. For example, in a case in which the communication apparatus is a projector, the function unit 203 is a projection unit and performs projection processing. Data to be processed by the function unit 203 may be data stored in the storage unit 201, or may be data communicated with another communication apparatus via the communication unit 206 (to be described later).

The input unit 204 accepts various operations from a user. The output unit 205 performs various kinds of outputs to the user. In this example, the output by the output unit 205 includes at least one of display on a screen, audio output by a loudspeaker, vibration output, and the like. Note that both the input unit 204 and the output unit 205 may be implemented by one module, like a touch panel. The communication unit 206 controls wireless communication complying with the IEEE802.11 standard series, or controls IP communication. In the embodiment, the communication unit 206 can execute processing complying with at least the IEEE802.11be standard. In addition, the communication unit 206 controls the antenna 207 to transmit/receive radio signals for wireless communication. The communication apparatus communicates a content such as image data, document data, or video data with another communication apparatus via the communication unit 206. The antenna 207 is an antenna capable of receiving signals in one of the sub-GHz band, 2.4-GHz band, 5-GHz band, and 6-GHz band. The radio antenna 207 may be constituted physically by one or more antennas in order to implement MIMO (Multi-Input and Multi-Output) transmission/reception.

Figure 3:
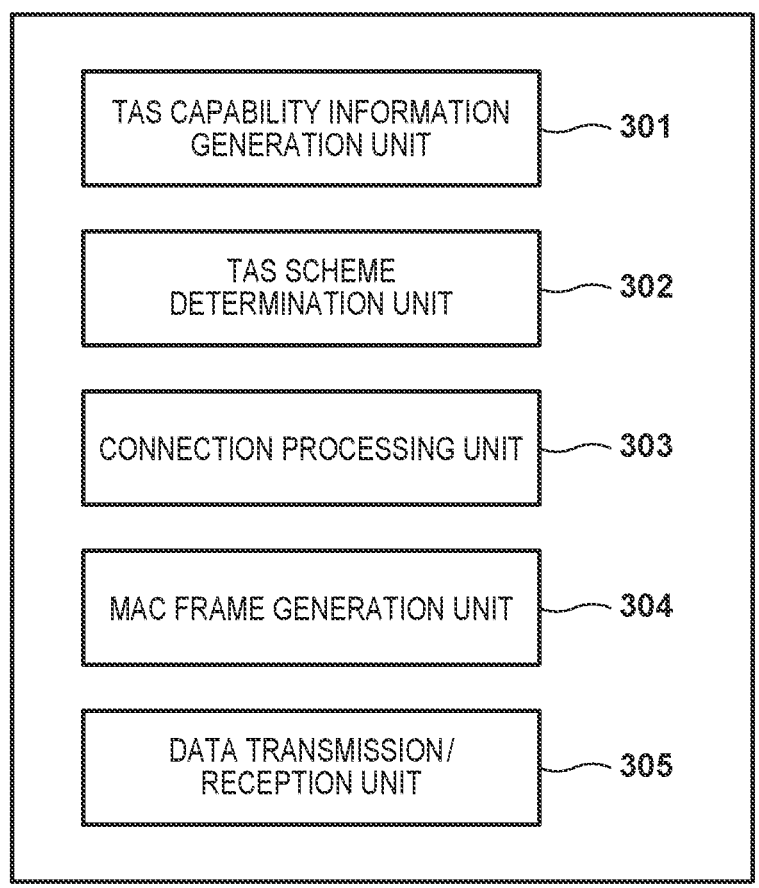
FIG. 3 is a block diagram showing an example of the functional arrangement of the communication apparatus.

FIG. 3 shows an example of a functional arrangement associated with TAS communication of the communication apparatus. The communication apparatus includes, for example, a TAS capability information generation unit 301, a TAS scheme determination unit 302, a connection processing unit 303, a MAC frame generation unit 304, and a data transmission/reception unit 305. Note that these functional units can be implemented when, for example, the control unit 202 executes the programs stored in the storage unit 201. However, the present invention is not limited to this and, for example, dedicated hardware components corresponding to the functional blocks shown in FIG. 3 may be used.

The TAS capability information generation unit 301 generates information (TAS capability information) of the TAS capability of the communication apparatus, and stores it in the storage unit 201. Based on the information concerning TAS received from the schedule management apparatus 106, the TAS capability information generation unit 301 can reconstruct the TAS capability information stored in the storage unit 201 or update contents of the TAS capability information. The TAS capability information includes a support ID indicating the TAS scheduling scheme of the communication apparatus. The support ID is an identifier corresponding to each of a plurality of schemes, and is used to indicate which of the schemes can be used. The TAS capability information will be described later with reference to FIGS. 9 to 12. Note that the communication apparatus executes at least one of a notification of the capability information of the self-apparatus to another communication apparatus and reception of the capability information of the other communication apparatus from that apparatus. That is, the communication apparatus may only receive the capability information of another communication apparatus and need not notify the other communication apparatus of the capability information of the self-apparatus.

The TAS scheme determination unit 302 determines, based on the TAS capability information of the communication partner apparatus, the TAS scheme to be used for communication with the partner apparatus. As the TAS schemes, there are generally two kinds of schemes of "shaping" and "policing". Since the characteristics of these schemes are different from each other, the scheme corresponding to the use application (application) is used based on the difference between the characteristics. The "policing" scheme is a scheme of reducing latency caused by queueing by dropping a packet exceeding a limit rate or changing the priority of a packet. The "shaping" scheme buffers a packet exceeding a limit rate in an I/F queue, thereby causing latency. For example, in a case of traffic using a TCP/UDP port number, a scheme selection can be made to use the "shaping" scheme for TCP and to use the "policing" scheme for UDP. For example, if the TAS scheme usable by the STA is only "shaping", "shaping" can be adopted, and if the TAS scheme usable by the STA is only "policing", "policing" can be adopted. If the STA can use both the TAS schemes of "shaping" and "policing", one of the TAS schemes is determined in accordance with the application feature of data transmitted/received to/from the STA. For example, the shaping scheme can be selected to transmit/receive data, such as sensor data, which is periodic but which is not restricted on latency or is not strictly restricted on latency. Alternatively, if an application which is restricted on a data arrival time because it requires a real time operation like a game or an industrial robot is used, the policing scheme can be selected so as to transmit/receive periodic data in consideration of latency control. Note that the shaping scheme and the policing scheme are merely examples, and another scheme may be usable. In this case, the TAS scheme determination unit 302 can select a scheme to be used from a plurality of usable schemes including the other scheme.

The TAS capability information can include information of the TAS scheme corresponding to the application feature of data to be transmitted/received, and the communication apparatus notifies the partner apparatus of the TAS capability information using, for example, a management frame defined by the IEEE802.11 standard at the time of connection or during communication. The information notification by the management frame will be described later with reference to FIG. 7. If the number of users (end devices) accommodated in one BSS is large, overhead may become large due to exchange of information for low-latency communication. To cope with this, the kind of the TAS scheme may be changed when the number of STAs accommodated by the AP is equal to or larger than a predetermined number. Note that the communication apparatus may or may not notify the communication partner apparatus of the TAS scheme determined by the TAS scheme determination unit 302.

The connection processing unit 303 performs processing for establishing connection between the STA and the AP. For example, the connection processing unit 303 of the STA transmits an Association Request frame to the AP. The connection processing unit 303 of the AP transmits an Association Response frame as a response to the Association Request frame. The MAC frame generation unit 304 generates a MAC frame that stores the TAS capability information generated by the TAS capability information generation unit 301, as needed. The MAC frame in this example is, for example, a MAC frame in a radio frame such as a Beacon frame, a Probe Request/Response frame, or an Association Request/Response frame. Alternatively, the MAC frame may be a MAC frame of a Reassociation Request/Response frame. Note that the TAS capability information can be stored in, for example, a portion of a MAC header. The TAS capability information or the TAS scheme information is transmitted using a capability element to be described later with reference to FIG. 9 or 11. The data transmission/reception unit 305 transmits/receives a TAS traffic data frame generated periodically at a strict timing in accordance with the TAS scheme determined by the TAS scheme determination unit 302. The TAS traffic data transmission processing in the data transmission/reception unit 305 will be described in detail later with reference to FIGS. 15 and 16.

(Procedure of Processing)

An example of the procedure of processing executed by the AP 102 when the STA 103 is connected to the AP 102 will be described with reference to FIG. 4. Note that the same processing can be executed even for another combination of the STA and the AP. This processing can be started when, for example, the STA 103 is powered on. Alternatively, this processing may be started when the user or application instructs, in the STA 103, to start data communication in which the TAS scheme should be used. Note that this processing is implemented when, for example, the control unit 202 of the AP 102 executes the program stored in the storage unit 201.

In this processing, the AP 102 obtains the TAS capability information of the STA 103 (step S401). For example, the TAS capability information shown in FIG. 9 or 10 (to be described later) is included in a Probe Request frame to be transmitted before the STA 103 is connected or an Association Request frame to be transmitted at the time of connection. The AP 102 can obtain the TAS capability information of the STA 103 by receiving the frame and analyzing its contents. Subsequently, the TAS scheme determination unit 302 of the AP 102 determines, based on the TAS capability information of the STA 103 obtained in step S401, the TAS scheme to be used for latency control (step S402). Then, the AP 102 determines whether the TAS scheme determined in step S402 can be used (step S403). If it is determined that the TAS scheme determined in step S402 cannot be used (NO in step S403), the AP 102 notifies the STA 103 that latency control cannot be executed. In this case, the AP 102 notifies the STA 103 of, for example, a management frame including the TAS capability information in which information (for example, an ID) indicating that latency control cannot be executed is set (step S406). On the other hand, if it is determined that the TAS scheme determined in step S402 can be used (YES in step S403), the TAS capability information generation unit 301 of the AP 102 notifies the STA 103 of the TAS scheme determined in step S402. In this case, the AP 102 notifies the STA 103 of, for example, a management frame including the TAS capability information in which a value indicating the TAS scheme determined in step S402 is set (step S404). Note that this value can be, for example, the TAS support ID corresponding to the TAS scheme. Then, the AP 102 stores, in the storage unit 201, the TAS capability information included in the management frame and notified to the STA 103 in step S404 or S406 (step S405). In this way, the TAS capability information is exchanged between the AP and the STA.

Figure 5:
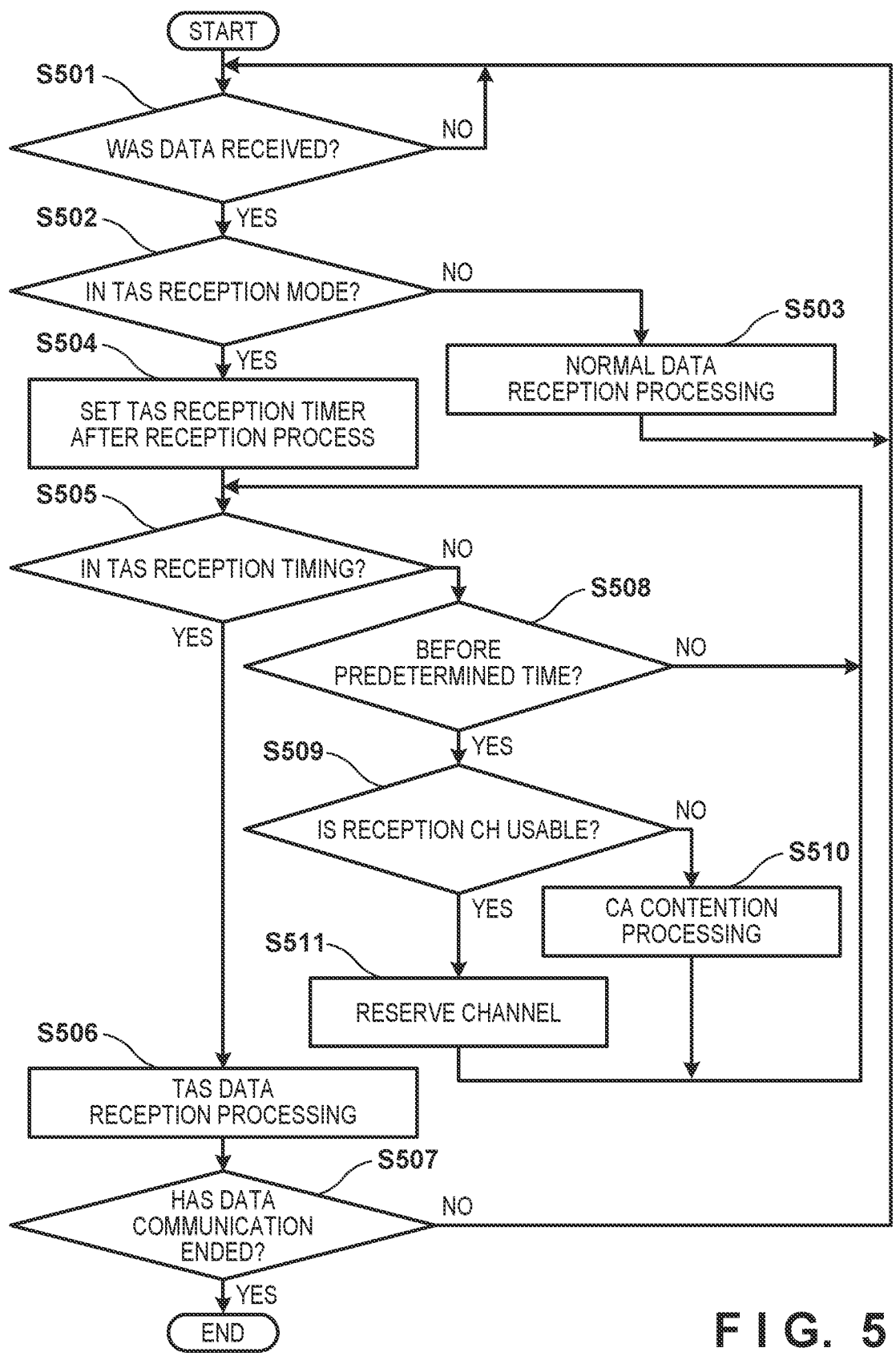
FIG. 5 is a flowchart illustrating an example of the procedure of data reception processing.

Subsequently, an example of the procedure of data reception processing executed by the STA 103 at the time of communication in a downlink (DL) as a link used to transmit a signal from the AP 102 to the STA 103 will be described with reference to FIG. 5. In this example, processing of TAS traffic data (sensor data or the like) when the apparatus such as the sensor apparatus 107 serves as a talker (transmission side) and the STA 103 serves as a listener (reception side) will be explained. For example, TAS traffic data periodically transmitted from the sensor apparatus 107 reaches the STA 103 via the bridges 104 and the AP 102. Note that this processing is also applicable to an uplink (UL) as a link used to transmit a signal from the STA 103 to the AP 102. The same processing can also be executed when the AP 102 receives data from the STA 103. In this case, in the following description, the STA 103 can be replaced by the AP 102.

When receiving data from the AP 102 (YES in step S501), the STA 103 determines whether the self-apparatus operates in a TAS reception mode such as policing or shaping. The processing of determining whether the self-apparatus operates in the TAS reception mode can be performed by, for example, confirming the TAS support ID stored in the storage unit 201 when the STA 103 receives the management frame from the AP 102. If the self-apparatus does not operate in the TAS reception mode such as policing or shaping (NO in step S502), the STA 103 executes normal data reception processing (step S503). On the other hand, if the self-apparatus operates in the TAS reception mode (YES in step S502), the STA 103 sets a TAS traffic data reception timer with a time interval shorter than the next TAS traffic data reception timing after the data reception processing, and activates the timer (step S504).

To determine whether the current time is the TAS traffic data reception timing, the STA 103 checks the TAS traffic data reception timer (step S505). If the current time is not the next TAS traffic data reception timing (NO in step S505), the STA 103 checks, for example, whether a predetermined time such as a timing immediately before reception has been reached (step S508). If the predetermined time has not been reached (NO in step S508), the STA 103 returns the process to step S505, and checks the TAS traffic data reception timing. On the other hand, if the predetermined time has been reached (YES in step S508), the STA 103 executes a carrier sense or the like to confirm the use state of a corresponding TAS traffic data reception channel (step S509). If it is determined that the reception channel is in a busy state (NO in step S509), the STA 103 executes channel access contention processing (step S510) to set the channel in an available state, and returns the process to step S505. If the reception channel is not busy but available (YES in step S509), the current time is immediately before the reception timing, and thus the STA 103 reserves the TAS traffic data reception channel by, for example, transmitting a null packet (step S511). Then, the STA 103 returns the process to step S505.

If the STA 103 checks the TAS traffic data reception timer, and determines that the current time is the TAS traffic data reception timing (YES in step S505), the STA 103 executes TAS traffic data reception processing (step S506). Then, the STA 103 determines whether data communication ends (step S507). If data communication continues (NO in step S507), the STA 103 returns the process to step S501. If data communication ends (YES in step S507), the STA 103 ends the data reception processing. As described above, the STA 103 can receive the TAS traffic data from the AP 102 at the predetermined reception timing (time) in wireless communication of the BSS 101.

Figure 6:
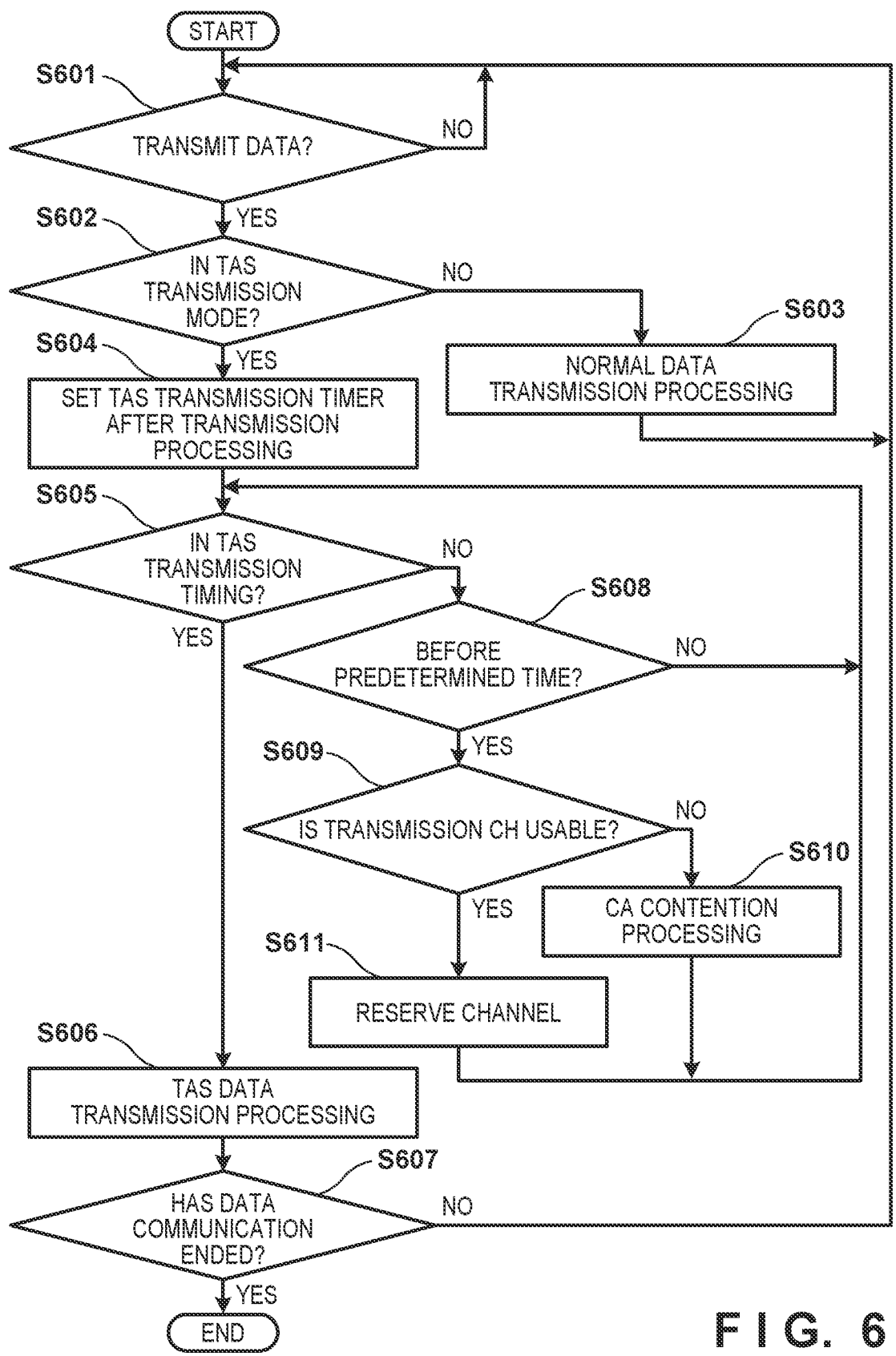
FIG. 6 is a flowchart illustrating an example of the procedure of data transmission processing.

An example of the procedure of data transmission processing executed by the STA 103 at the time of communication in the uplink (UL) will be described with reference to FIG. 6. In this example, processing of TAS traffic data (remote control data or the like) when the STA 103 serves as a talker (transmission side) and the apparatus such as the remote apparatus 108 serves as a listener (reception side) will be explained. For example, TAS traffic data periodically transmitted from the STA 103 reaches the remote apparatus 108 via the AP 102 and the bridges 104. Note that this processing is also applicable to the downlink (DL). The same processing can also be executed when, for example, the AP 102 transmits data from the STA 103. In this case, in the following description, the STA 103 can be replaced by the AP 102.

The STA 103 continuously monitors whether transmission data is generated by, for example, receiving a data transmission request from the control application of the remote apparatus 108 implemented in the self-apparatus (step S601). Then, if generation of transmission data is detected (YES in step S601), the STA 103 determines whether the self-apparatus operates in a TAS transmission mode such as policing or shaping. The processing of determining whether the self-apparatus operates in the TAS transmission mode can be performed by, for example, confirming the TAS support ID stored in the storage unit 201 when the STA 103 receives the management frame from the AP 102. If the self-apparatus does not operate in the TAS transmission mode such as policing or shaping (NO in step S602), the STA 103 executes normal data transmission processing (step S603). On the other hand, if the self-apparatus operates in the TAS transmission mode (YES in step S602), the STA 103 sets a TAS traffic data transmission timer with a time interval shorter than the next TAS traffic data transmission timing after the data transmission processing, and activates the timer (step S604).

To determine whether the current time is the TAS traffic data transmission timing, the STA 103 checks the TAS traffic data transmission timer (step S605). If the current time is not the next TAS traffic data transmission timing (NO in step S605), the STA 103 checks, for example, whether a predetermined time such as a timing immediately before transmission has been reached (step S608). If the predetermined time has not been reached (NO in step S608), the STA 103 returns the process to step S605, and checks the TAS traffic data transmission timing. On the other hand, if the predetermined time has been reached (YES in step S608), the STA 103 executes a carrier sense or the like to confirm the use state of a corresponding TAS traffic data transmission channel (step S609). If it is determined that the transmission channel is in a busy state (NO in step S609), the STA 103 executes channel access contention processing (step S610) to set the channel in an available state, and returns the process to step S605. If the transmission channel is not busy but available (YES in step S609), the current time is immediately before the transmission timing, and thus the STA 103 reserves the TAS traffic data transmission channel by, for example, transmitting a null packet (step S611). Then, the STA 103 returns the process to step S605.

If the STA 103 checks the TAS traffic data transmission timer, and determines that the current time is the TAS traffic data transmission timing (YES in step S605), the STA 103 executes TAS traffic data transmission processing (step S606). The TAS traffic data transmission processing will be described later with reference to FIGS. 15 and 16. After that, the STA 103 determines whether data communication ends (step S607). If data communication continues (NO in step S607), the STA 103 returns the process to step S601. If data communication ends (YES in step S607), the STA 103 ends the data transmission processing. As described above, the STA 103 can transmit the TAS traffic data to the AP 102 at the predetermined transmission timing (time) in wireless communication of the BSS 101.

As described above, the STA 103 can transmit the TAS traffic data to the AP 102 at the predetermined transmission timing. By executing the processes shown in FIGS. 5 and 6 between the STA and the AP, the TAS traffic data is periodically transmitted at the preset time. When an operation is executed so that communication is performed at the time preset appropriately based on the network topology, an unnecessary standby time is reduced, thereby making it possible to implement low-latency communication.

Figure 7:
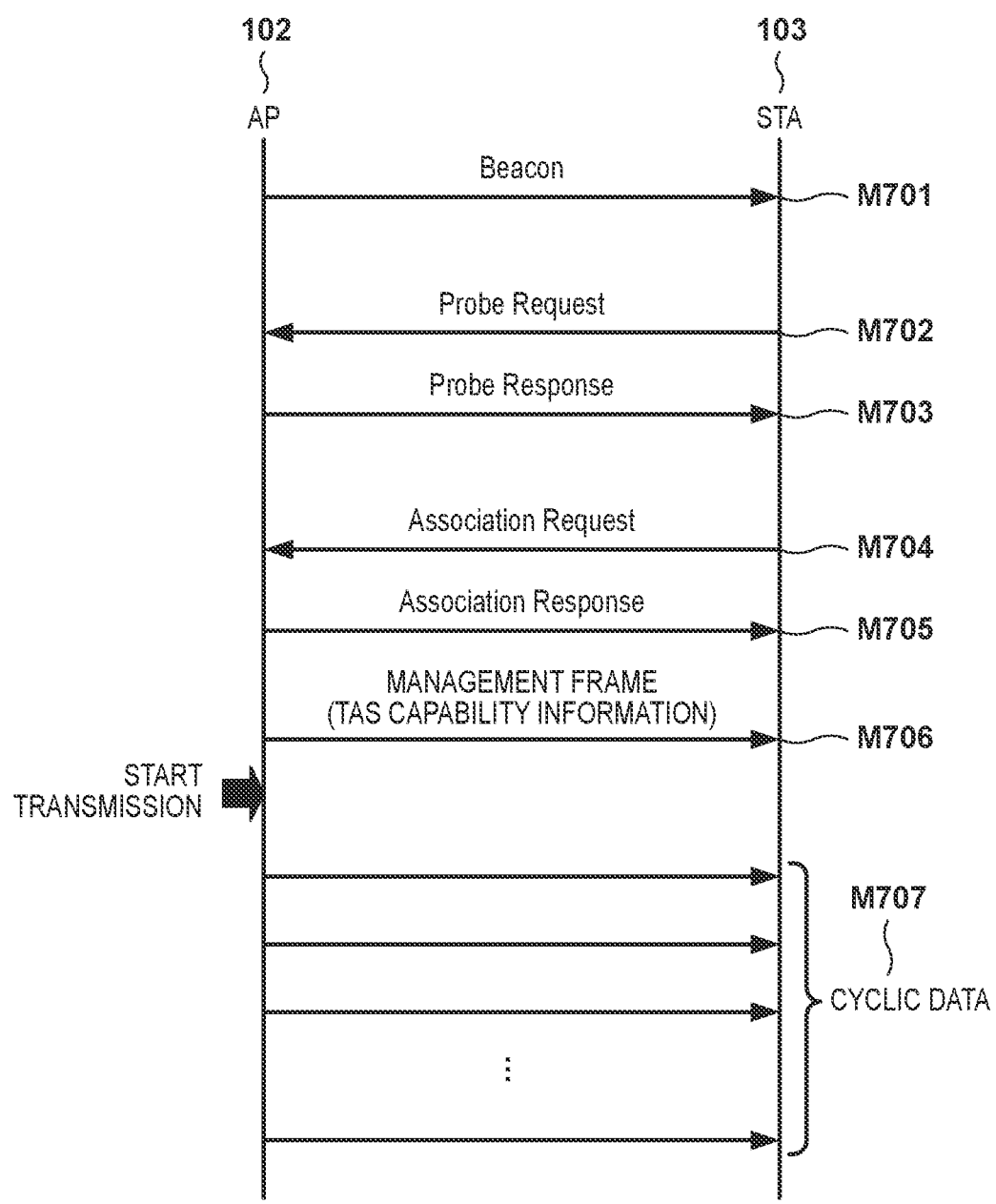
FIG. 7 is a sequence chart showing an example of the flow of messages transmitted/received between the AP and an STA at the time of DL communication.

Subsequently, an example of the flow of messages transmitted/received between the AP 102 and the STA 103 at the time of downlink (DL) communication will be described with reference to FIG. 7. This processing is executed when TAS traffic data from an apparatus such as the sensor apparatus 107 operating as a talker is received by the STA 103 as a listener via the bridges 104 and the AP 102. First, the STA 103 executes scan processing for obtaining network information of the AP 102. For example, the AP 102 broadcasts a Beacon frame (M701) including the network information to apparatuses in the area of the BSS 101. At this time, the AP 102 may broadcast a Beacon frame including TAS scheme capability information to be described later with reference to FIG. 9 or 10. The STA 103 may transmit a Probe Request frame (M702) for inquiring about the network information of the AP 102, and obtains the information from the AP 102. In response to the Probe Request frame (M702), the AP 102 transmits a Probe Response frame (M703). For example, the STA 103 can receive the Beacon frame (M701) transmitted by the AP 102, and obtain the network information of the AP 102 from the Beacon frame. Alternatively, the STA 103 may actively transmit the Probe Request frame (M702), and receive the Probe Response frame (M703) from the AP 102, thereby obtaining the network information of the AP 102. At this time, the Beacon frame (M701) and the Probe Response frame (M703) include, as TAS capability information, information indicating whether the AP 102 supports the TAS scheme. If the TAS scheme is supported, the TAS capability information included in the frame can indicate whether only the policing scheme is supported, only the shaping scheme is supported, or both the schemes are supported. The STA 103 can include the TAS capability information of the STA 103 in the Probe Request frame (M702) and transmit it. With these processes, the STA 103 and the AP 102 can exchange the TAS capability information. However, the TAS capability information may be exchanged by another message such as an Association Request/Response frame (to be described later) without exchanging the TAS capability information at this timing.

After the scan processing, the STA 103 transmits an Association Request frame (M704) to the AP 102 to be connected to the BSS 101. In response to the Association Request frame (M704), the AP 102 transmits, to the STA 103, an Association Response frame (M705) indicating the connection result of the STA 103. The association Request frame and the Association Response frame may include the TAS capability information. The STA 103 may determine the TAS capability information to be included in the Association Request frame based on the TAS capability information of the AP 102 obtained by the scan processing. In one example, when both the shaping scheme and the policing scheme can be used, the STA 103 may select, in accordance with the application of communication by the TAS scheme, a scheme to be used, and notify the AP 102 of information indicating that only the selected scheme can be used. If, for example, the sensor apparatus 107 serves as a talker, the STA 103 that can use both the schemes may transmit, to the AP 102, the Association Request frame (M704) including the TAS capability information indicating that the self-apparatus can use only the shaping scheme. Alternatively, if the remote apparatus 108 serves as a listener, the STA 103 that can use both the schemes may transmit, to the AP 102, the Association Request frame (M704) including the TAS capability information indicating that the self-apparatus can use only the policing scheme. Similarly, the AP 102 may determine the TAS capability information to be included in the Association Response frame based on the TAS capability information of the STA 103 included in the Association Request frame. In this way, the TAS capability information is exchanged before connection between the AP 102 and the STA 103 is established.

After that, after confirming that TAS communication is possible, the AP 102 transmits a management frame (M706) to the STA 103. In this management frame, for example, information indicating that the shaping scheme is to be used is included in the TAS capability information at the time of DL data communication. This management frame can include, for example, information indicating a schedule according to which data are to be transmitted/received by the TAS scheme. After that, the STA 103 serving as a listener periodically receives, via the AP 102, TAS traffic data (M707) from the sensor apparatus 107 serving as a talker. For example, the STA 103 executes the data reception processing described with reference to FIG. 5, thereby receiving the TAS traffic data (M707). For example, the AP 102 executes the data transmission processing described with reference to FIG. 6, thereby transmitting the TAS traffic data (M707).

Figure 8:
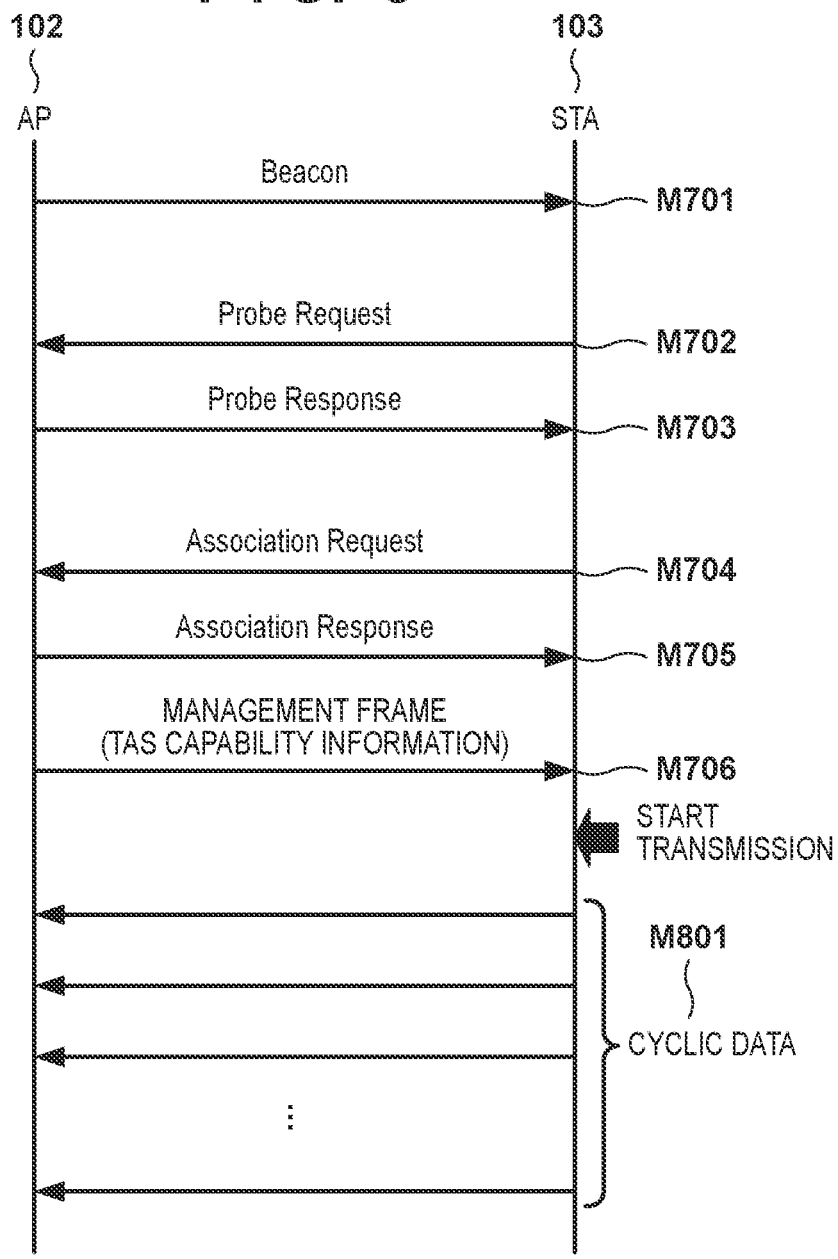
FIG. 8 is a sequence chart showing an example of the flow of messages transmitted/received between the AP and the STA at the time of UL communication.

Subsequently, an example of the flow of messages transmitted/received between the AP 102 and the STA 103 at the time of UL communication will be described with reference to FIG. 8. This processing is executed when the STA 103 serving as a talker transmits TAS traffic data that is received by an apparatus such as the remote apparatus 108 via the AP 102 and the bridges 104. In this example, the messages M701 to M703 concerning scan processing, the messages M704 to M705 concerning STA connection processing, and the management frame M706 are the same as in FIG. 7. Note that since the remote apparatus 108 serves as a listener, the STA 103 that can support both the schemes can include, in the Association Request frame, the TAS capability information indicating that the self-apparatus can use only the policing scheme, and transmit the Association Request frame to the AP 102. Note that in the management frame (M706), for example, information indicating that the policing scheme is to be used is included in the TAS capability information at the time of UL data communication. This management frame can include, for example, information indicating a schedule according to which data are to be transmitted/received by the TAS scheme. After that, the STA 103 serving as a talker periodically transmits, via the AP 102, TAS traffic data (M801) to the remote apparatus 108 serving as a listener. For example, the STA 103 executes the data transmission processing described with reference to FIG. 6, thereby transmitting the TAS traffic data (M801). For example, the AP 102 executes the data reception processing described with reference to FIG. 5, thereby receiving the TAS traffic data (M801).

As described above, the AP 102 and the STA 103 can exchange the TAS capability information of the self-apparatus, and can determine whether communication by the TAS scheme is performed in communication thereafter, and which of the shaping scheme and the policing scheme is to be used. Therefore, by executing the processing to be described later with reference to FIGS. 15 and 16, it is possible to perform wireless communication by scheduling according to the time, thereby implementing low-latency communication.

Figure 9:
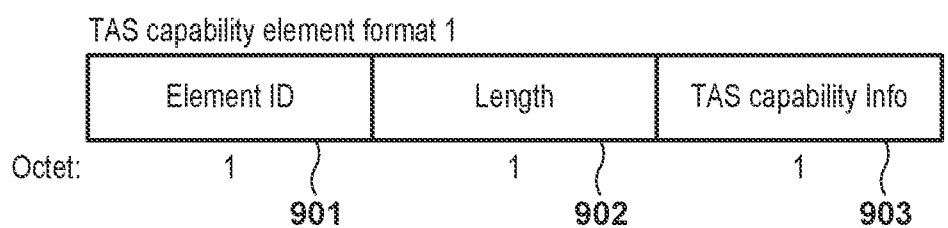
FIG. 9 is a view showing an example of the structure of TAS capability information.

Next, the first example of the TAS capability information will be described with reference to FIG. 9. Note that in this embodiment, the name of the TAS capability information is "TAS capability element" but the present invention is not limited to this. For example, another name such as "TAS Element" may be used. The TAS capability element has the same structure as that of another Information Element defined by the IEEE802.11 standard. That is, the TAS capability element is formed by including an Element ID field 901 for identifying an Element, a Length field 902 indicating the data length of the Element, and Element-specific information. The TAS capability element includes a TAS capability Info field 903 as the Element-specific information. The TAS capability element is included in, for example, a MAC frame such as a Beacon frame, a Probe Request/Response frame, or an Association Request/Response frame. Note that the TAS capability element may be included in a MAC frame of a Reassociation Request/Response frame. The TAS capability Info field 903 includes information indicating whether the transmitter of the TAS capability element can use the TAS scheme, and the usable TAS scheme. This information is represented by, for example, 2 bits. An example of the information represented by 2 bits will be described later with reference to FIG. 11. Note that the TAS capability Info field 903 has a size of 1 octet (8 bits) in this example but the present invention is not limited to this. The names of the fields and the positions and sizes of bits are not limited to the example shown in FIG. 9 and pieces of similar information may be stored with different field names in a different order and different sizes.

The second example of the TAS capability information will be described with reference to FIG. 10. Similar to the example shown in FIG. 9, the TAS capability element includes the Element ID field 901 and the Length field 902. This information can be included in a MAC frame of each radio frame described above, instead of the information shown in FIG. 9. The TAS capability element shown in FIG. 10 can be the same as that shown in FIG. 9 except for a TAS capability Info field 1001. However, since the size of the TAS capability Info field is different, a value stored in the Length field 902 is different between FIGS. 9 and 10. In the example shown in FIG. 10, the TAS capability Info field 1001 is formed by information indicating availability of the TAS scheme in each primary channel in addition to availability of the TAS scheme or the like. The primary channel is a main channel for supporting a multi-link technique of using a plurality of radio channels at the same time, and is used to control transmission/reception of capability information of another radio link and messages associated with connection and disconnection. Note that the relationship between the primary channel and the TAS scheme capability information will be described later with reference to FIG. 14. Note that the primary channel will sometimes be referred to as "PCH" hereinafter.

A TAS support field 1002 includes information indicating whether the transmitter of the TAS capability element can use the TAS scheme, and the usable TAS scheme. In one example, this information is represented by 2 bits. An example of the information represented by 2 bits will be described later with reference to FIG. 11. A PCH 1 availability field 1003, a PCH 2 availability field 1004, a PCH 3 availability field 1005, a PCH 4 availability field 1006, a PCH 5 availability field 1007, a PCH 6 availability field 1008, a PCH 7 availability field 1009, a PCH 8 availability field 1010, and a PCH 9 availability field 1011 are fields each indicating availability of the TAS scheme in each of primary channels 1 to 9. A value stored in each of these fields and contents indicated by the value will be described later with reference to FIG. 12. A Reserve field 1012 is a 5-bit unused region for future extension. An example in which the TAS capability Info field 1001 has a size of 2 octets (16 bits) is shown but the present invention is not limited to this. For example, pieces of similar information may be indicated by different field names at different bit positions in different field sizes. Note that in this embodiment, the name of the element shown in FIG. 10 is the TAS capability element. However, the present invention is not limited to this, and for example, another name such as a TAS Multi-Link Element may be used.

An example of the information indicating whether the transmitter of the information can use the TAS scheme, and the usable TAS scheme in the TAS capability information shown in FIG. 9 or 10 will be described with reference to FIG. 11. Note that the information indicating whether the TAS scheme can be used and the usable TAS scheme will sometime be referred to as a TAS support status hereinafter. Referring to FIG. 11, a D-bit value 1101 represents a 2-bit data bit (D-bit) value stored in the TAS capability Info field 903 shown in FIG. 9 or the TAS support field 1002 shown in FIG. 10. Note that a bit string represented by the D-bit value can be a TAS support ID. TAS support contents 1102 indicate contents corresponding to each TAS support ID. For example, a bit value "00" of the D-bit value 1101 indicates that the TAS scheme is not supported (unavailable). A bit value "01" of the D-bit value 1101 indicates that the TAS scheme is supported but only the shaping scheme can be used. A bit value "10" of the D-bit value 1101 indicates that the TAS scheme is supported but only the policing scheme can be used. A bit value "11" of the D-bit value 1101 indicates that the TAS scheme is supported and both the policing scheme and the shaping scheme can be used. Note that the setting value concerning each information element is not limited to this example, and pieces of similar information may be indicated by different field names or different values.

Figure 10:
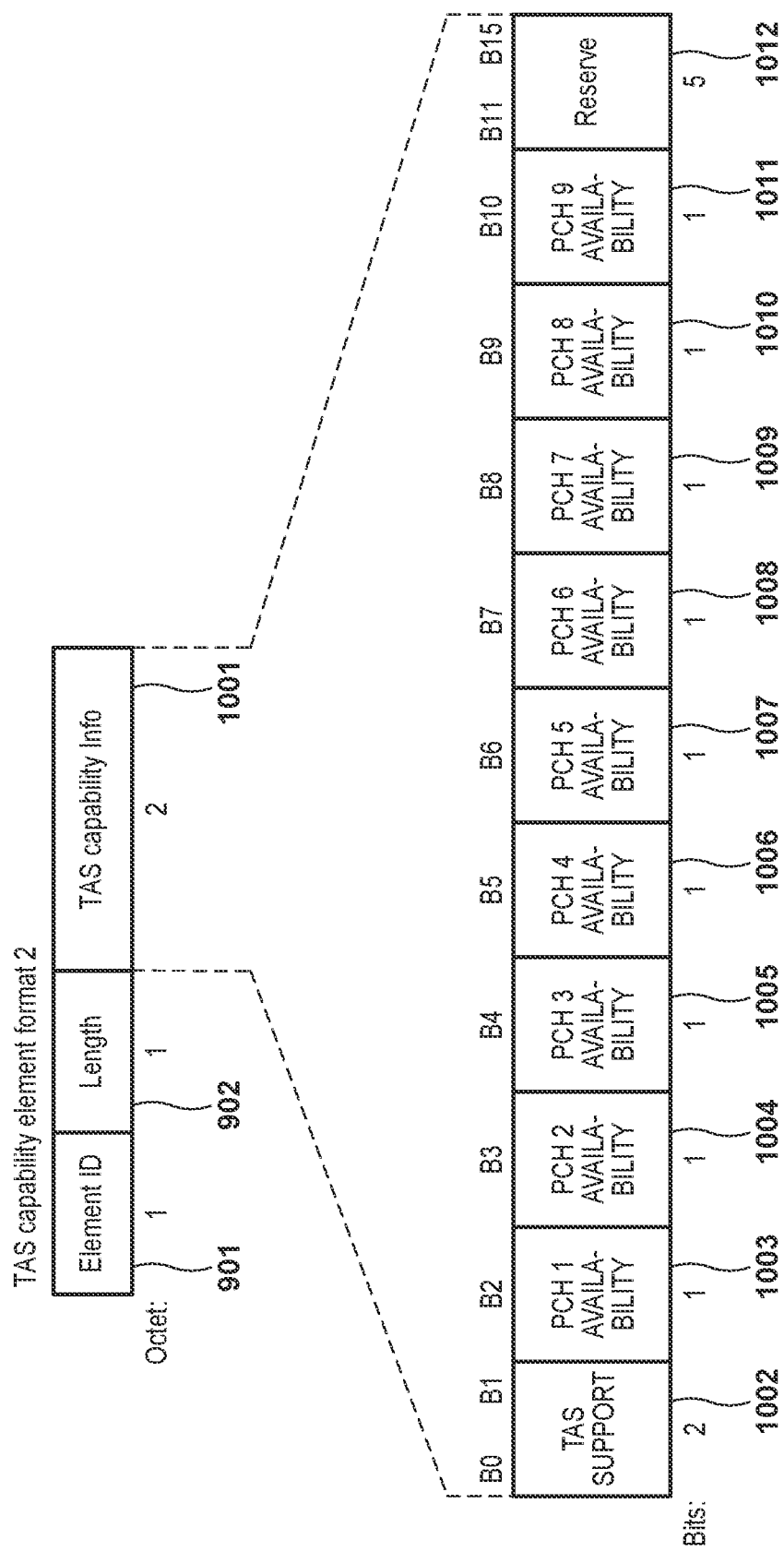
FIG. 10 is a view showing an example of the structure of TAS capability information.

FIG. 12 shows an example of a value stored in each of the PCH 1 availability field 1003, the PCH 2 availability field 1004, the PCH 3 availability field 1005, the PCH 4 availability field 1006, the PCH 5 availability field 1007, the PCH 6 availability field 1008, the PCH 7 availability field 1009, the PCH 8 availability field 1010, and the PCH 9 availability field 1011 shown in FIG. 10 and contents corresponding to the value. In each of the PCH 1 availability field 1003, the PCH 2 availability field 1004, the PCH 3 availability field 1005, the PCH 4 availability field 1006, the PCH 5 availability field 1007, the PCH 6 availability field 1008, the PCH 7 availability field 1009, the PCH 8 availability field 1010, and the PCH 9 availability field 1011, an E-bit 1201 which is formed so that contents 1202 are different depending on a combination with the value in the TAS support field 1002 is stored. For example, if the two bits stored in the TAS support field 1002 indicate the policing scheme (D-bit value "10") or the shaping scheme (D-bit value "01"), the E-bit represents availability of each TAS scheme. For example, when "1" is set in the E-bit, it can be indicated that the TAS scheme represented by the D-bit value can be used. When "0" is set in the E-bit, it can be indicated that the TAS scheme represented by the D-bit value cannot be used. Note that this is merely an example, and it may be indicated that the TAS scheme represented by the D-bit value can be used by setting "0" in the E-bit, and that the TAS scheme represented by the D-bit value cannot be used by setting "1" in the E-bit. Furthermore, if the two bits stored in the TAS support field 1002 indicate that both the policing scheme and the shaping scheme can be used (if the D-bit value is "11"), one of the schemes can be designated by one bit of the E-bit. For example, the policing scheme is designated by setting "1" in the E-bit, and the shaping scheme is designated by setting "0" in the E-bit. Alternatively, the policing scheme may be designated by setting "0" in the E-bit, and the shaping scheme may be designated by setting "1" in the E-bit.

Figure 13:
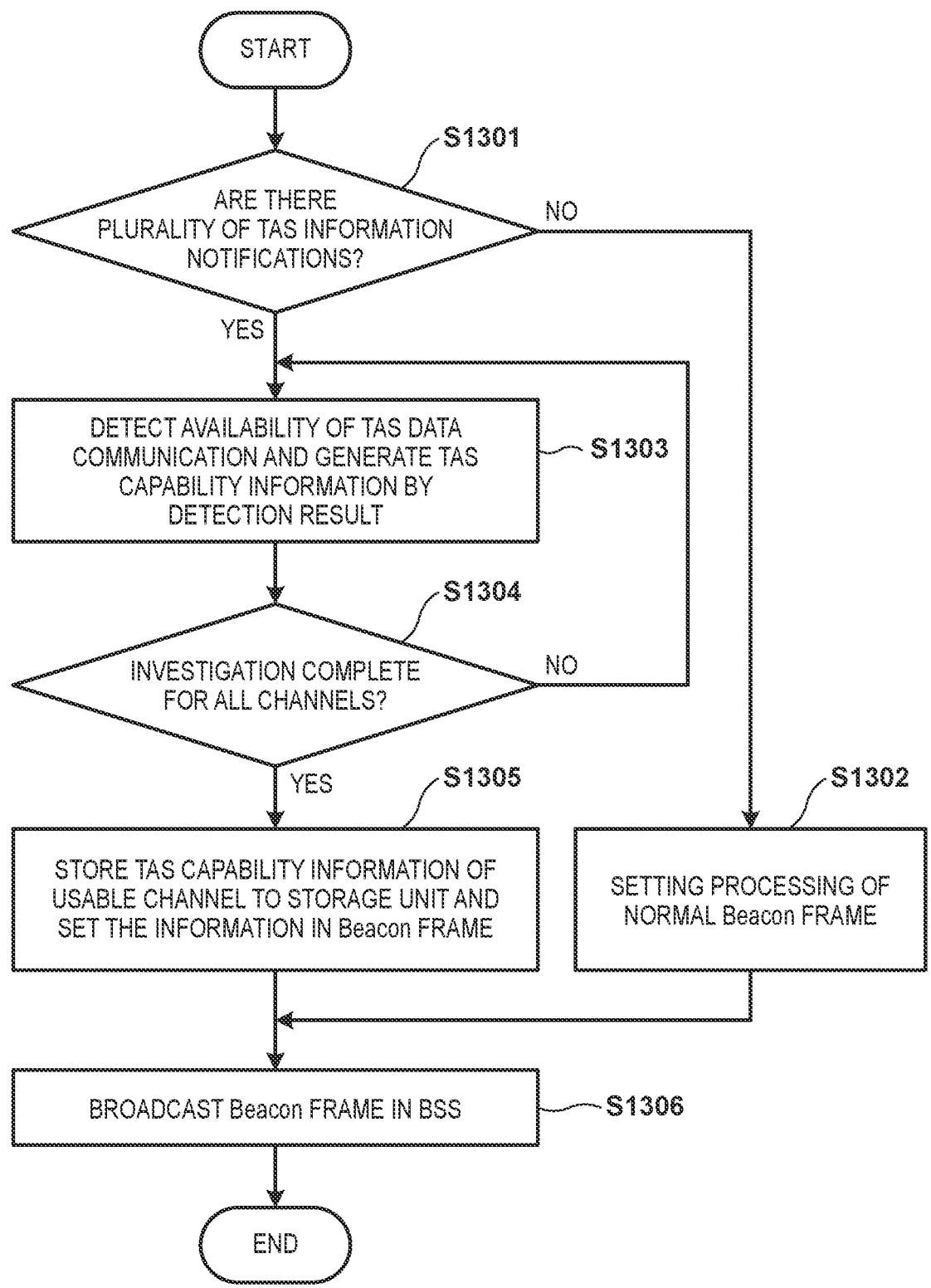
FIG. 13 is a flowchart illustrating an example of the procedure of processing when broadcasting the TAS capability information by a Beacon frame.

An example of the procedure of processing executed by the AP 102 when broadcasting the TAS capability information shown in FIG. 10 by a Beacon frame will be described with reference to FIG. 13. This processing is started when, for example, the AP 102 is powered on or collection processing of data of the TAS scheme is activated in the AP 102. Note that this processing can be implemented when, for example, the control unit 202 of the AP 102 executes the program stored in the storage unit 201.

The AP 102 determines whether it is set in a mode of including the multi-channel TAS information shown in FIG. 10 in a Beacon frame (step S1301). If it is determined that the mode of including the multi-channel TAS information in a Beacon frame is not set (NO in step S1301), the AP 102 executes conventional Beacon frame setting processing (step S1302). Then, the AP 102 broadcasts, in the BSS 101, the Beacon frame obtained by the setting processing in step S1302 (step S1306). Note that in this case, the AP 102 may transmit, for example, the Beacon frame including the TAS information shown in FIG. 9.

Figure 4:
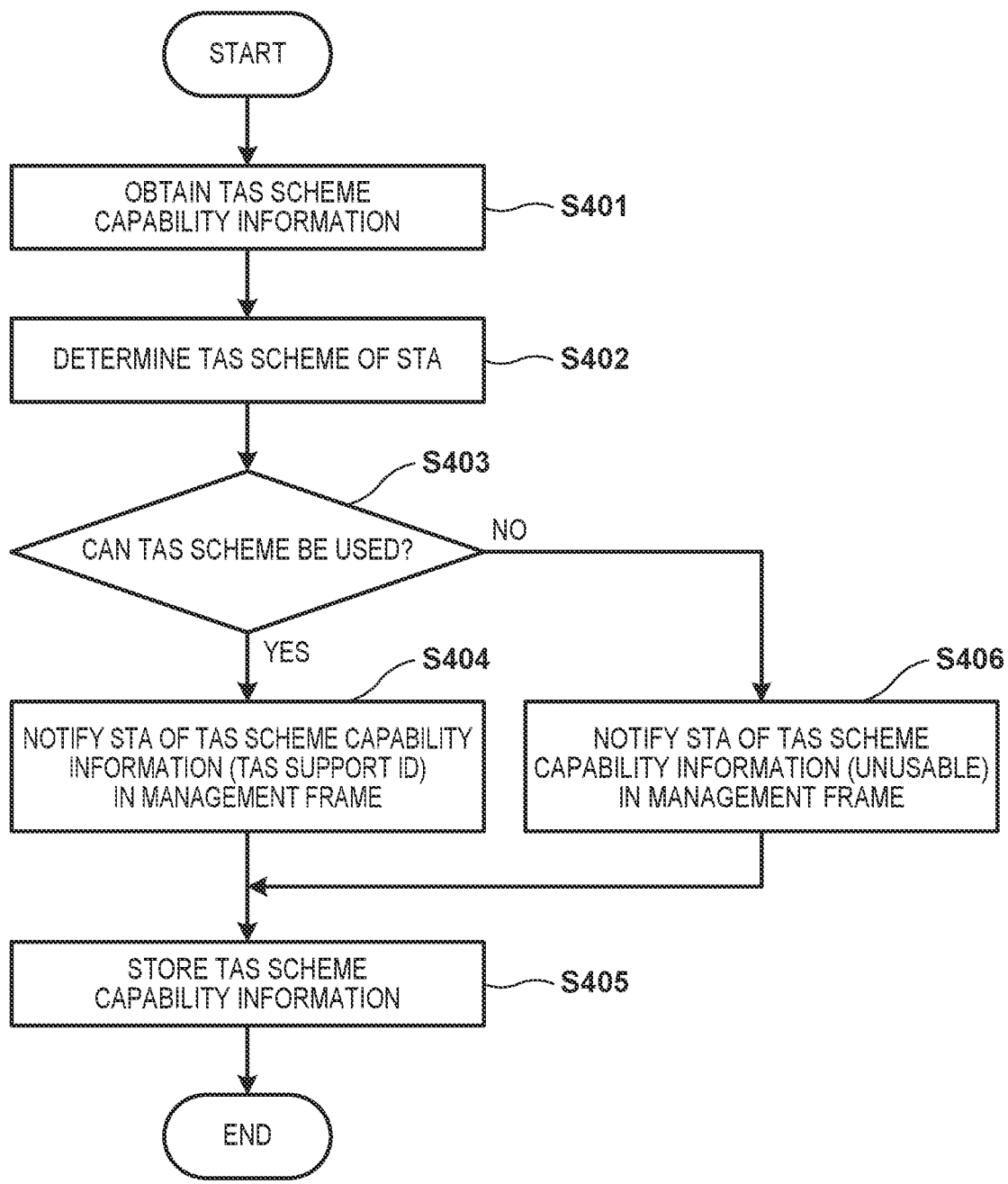
FIG. 4 is a flowchart illustrating an example of the procedure of processing executed by an AP at the time of STA connection.

If the mode of including the multi-channel TAS information in the Beacon frame is set (YES in step S1301), the AP 102 determines availability of each of the plurality of PCHs based on the TAS scheme capability information stored in step S405 of FIG. 4 (step S1303). To do this, the AP 102 transmits an RTS (Request To Send) message. Then, upon receiving the RTS message in each PCH, the STA 103 executes a carrier sense in the PCH. If the PCH is not in the busy state, the STA 103 transmits a CTS (Clear To Send) message to the AP 102 after a lapse of a SIFS (Short Inter Frame Space) period. The AP 102 confirms whether the CTS message is received in each PCH in which the RTS message has been transmitted, and recognizes, as an unavailable PCH, the PCH for which the reception of the CTS message is confirmed. At this time, with respect to the PCH for which the reception of the CTS message cannot be confirmed, the TAS capability information generation unit 301 of the AP 102 recognizes that TAS communication cannot be used.

Then, the TAS capability information generation unit 301 updates the information of availability of the TAS scheme concerning each PCH in the TAS capability information. When the processing in step S1303 is complete for all the plurality of available PCHs (YES in step S1304), the AP 102 stores the confirmed TAS capability information in the storage unit 201, and sets the TAS capability information in the Beacon frame (step S1305). The AP 102 broadcasts, in the BSS 101, the Beacon frame including the TAS capability information (step S1306). Note that the Beacon frame including the TAS capability information shown in FIG. 9 or 10 may be broadcasted in the plurality of PCHs.

As described above, the AP 102 can include the information of the plurality of PCHs in the Beacon frame and transmit it. This allows, for example, the STA 103 to select a PCH in which communication can be performed in consideration of latency control by the TAS capability information and use it. Among the PCHs having the TAS capability information, a PCH in which the size of a signal bandwidth is equal to or larger than a predetermined width may be selected or a PCH in which the signal bandwidth is large may be preferentially selected. Among the PCHs in the TAS capability information, a PCH in which the reception field intensity or the signal-to-noise ratio (SNR) is higher than a predetermined value may be selected, or a PCH in which these values are satisfactory may be preferentially selected. Among the PCHs in the TAS capability information, a PCH in which a channel transmission capacity calculated from the bandwidth and SNR is equal to or larger than a predetermined value may be selected, or a PCH in which the capacity is large may be preferentially selected. Among the PCHs in the TAS capability information, a PCH to be used may be selected based on free channel information estimated from a channel use status in a predetermined period. A condition other than those PCH selection conditions may be used. Furthermore, one or more of the above-described selection conditions may be used in combination.

Figure 14:
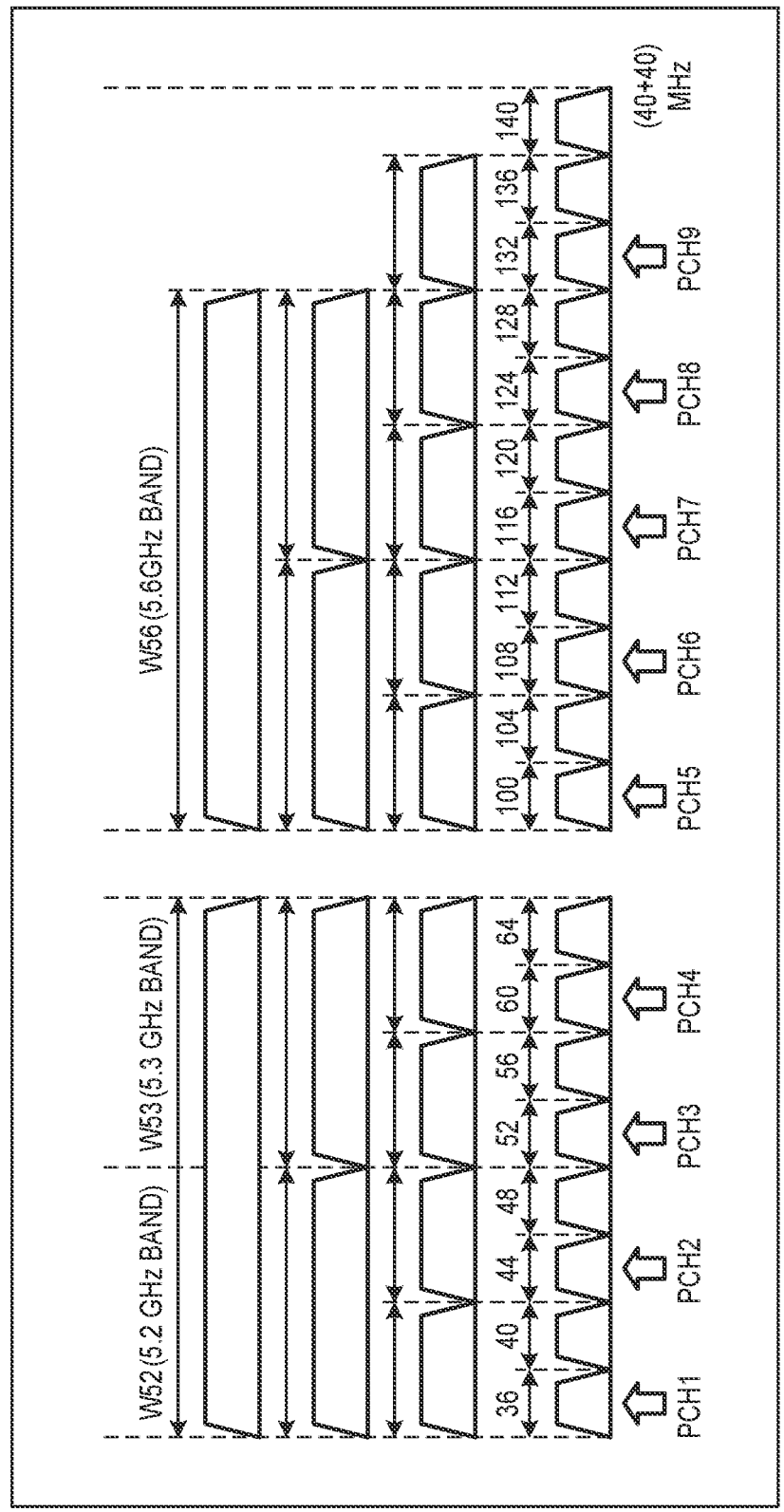
FIG. 14 is a view for explaining an example of a primary channel in a 5-GHz band.

PCHs 1 to 9 will be described with reference to FIG. 14. PCHs 1 to 9 indicate a plurality of PCHs available in the 5-GHz band. For example, PCHs 1 to 9 are frequency channels of a 20-MHz bandwidth with channel numbers of 36, 44, 52, 60, 100, 108, 116, 124, and 132. Note that the 5-GHz frequency band has been explained but the same discussion is also applicable to 2.4- or 6-GHz frequency band. The above-described discussion may be applied not only to the PCHs but also to another arbitrary frequency channel.

Time-Aware Scheduling (TAS) traffic data transmission processing in the AP and the STA according to this embodiment will be described with reference to FIG. 15. As one example, the AP 102 and the STA 103 have an arrangement shown in FIG. 15 for the TAS traffic data transmission processing. In the arrangement shown in FIG. 15, an application 1501 receives TAS scheme information determined by the above-described TAS scheme determination unit 302 before a state in which communication of TAS traffic data is in progress is set. To execute the transmission processing in accordance with the TAS scheme information, the application 1501 prepares for a data transmission request from the MAC frame generation unit 304. A traffic classification function 1503 receives traffic data added with priority information from the MAC frame generation unit 304, and maps temporally restricted traffic data in a TAS queue (Q0) 1504. The traffic classification function 1503 maps best effort traffic data other than the TAS traffic data in each of BE queues (Q1 to Q4) 1505. A TAS time gate control function 1502 temporarily stops/resumes each of a TAS time gate (G0) 1506 and various BE time gates (G1 to G4) 1507, thereby executing output control of the traffic data accumulated in each queue. For example, as will be described later, the TAS time gate control function 1502 executes control to protect the TAS traffic data while avoiding channel access contention.

TAS traffic data transmission processing using the plurality of time gates (G0 to G4) will be described with reference to FIG. 16. A curve 1601 indicates the OPEN/CLOSE state of the TAS time gate (G0) 1506, and curves 1602 to 1605 indicate the OPEN/CLOSE states of the various BE time gates (G1 to G4) 1507, respectively. In these curves, "1" indicates the OPEN state, and "0" indicates the CLOSE state. If the time gate is opened, the data in the queue corresponding to the time gate can be output via the time gate. A guard time 1606 indicates a time Tg during which transmission of all the gates is blocked. This guard time 1606 can prevent various BE traffic data from colliding against the TAS traffic data. A timing 1607 indicates a timing To at which the TAS time gate (G0) 1506 is periodically opened. The timing To is generated for every cycle 1608. The cycle 1608 is defined by an interval Tp at which data is transmitted at a strict and periodic timing designated by a TAS traffic data transmission request. A period 1609 indicates a time section Tc during which the TAS time gate (G0) 1506 of the TAS queue (Q0) 1504 is opened, and indicates a period during which the TAS traffic data is transmitted at a strict and periodic timing.

The TAS time gate control function 1502 executes gate control corresponding to the transmission/reception schedule of the TAS traffic data which is periodically repeated. The TAS time gate control function 1502 can close or open each time gate by, for example, inputting a bit of 0 or 1 to each time gate. The TAS time gate control function 1502 can indicate the OPEN/CLOSE states of the five time gates G0 to G4 by a 5-bit string. Then, each time gate can extract a bit corresponding to itself from the bit string, and execute control of the CLOSE/OPEN state. The TAS time gate control function 1502 may output, to each time gate, 1-bit information indicating whether the time gate is closed or opened. The states of the time gates for each bit string will now be described. Note that the bit string indicates the OPEN/CLOSE states of the time gates in the order of "G0·G1·G2·G3·G4". A bit string "00000" indicates a data block state. This state corresponds to the guard time 1606, and all the time gates (G0 to G4) are closed. A bit string "10000" indicates a state in which only the TAS time gate (G0) 1506 is opened, and this state corresponds to the period 1609. A bit string "01111" indicates a state in which the various BE time gates (G1 to G4) 1507 are opened, and the state corresponds to, for example, a period obtained by excluding the period 1609 and the guard time 1606 from the cycle 1608. In this way, the TAS time gate control function 1502 can control the CLOSE/OPEN state of each time gate by a 1-bit indicator.

As described above, at the transmission timing of TAS traffic data which should be transmitted at a strict timing, the TAS traffic data can be processed without latency using the time gates (G0 to G4) while blocking data which should not be transmitted.

According to the present invention, it is possible to implement reliable low-latency communication.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication apparatus operating as an access point, comprising:
at least one memory that stores a set of instructions; and
at least one processing circuit, wherein the communication apparatus is caused, by the at least one processing circuit executing the instructions and/or the at least one processing circuit itself operating, to perform operations comprising:
transmitting a radio frame complying with an IEEE802.11 be standard to another communication apparatus,
wherein a MAC (Media Access Control) frame of the radio frame transmitted includes an information element indicating whether the communication apparatus supports a scheme of scheduling of transmission opportunities in which contention is restricted based on a time to perform a low-latency communication,
wherein the radio frame including the MAC frame including the information element indicating whether the communication apparatus supports the scheme of scheduling of the transmission opportunities is one of a Beacon frame a Probe Response frame, an Association Response frame, and a Reassociation Response frame.

2. The communication apparatus according to claim 1, wherein the information concerning the scheduling of transmission opportunities in which contention is restricted based on the time includes information indicating which of a plurality of schemes of the scheduling of transmission opportunities in which contention is restricted based on the time can be used by the communication apparatus that has transmitted the radio frame.

3. The communication apparatus according to claim 1, wherein the MAC frame includes an element containing one ID subfield and multiple fields including the information concerning the scheduling of transmission opportunities in which contention is restricted based on the time for each of a plurality of frequency channels.

4. The communication apparatus according to claim 3, wherein
the MAC frame includes a first value indicating which of a plurality of schemes of the scheduling of transmission opportunities in which contention is restricted based on the time can be used by the communication apparatus that has transmitted the radio frame, and a second value for each of the plurality of frequency channels, and
a combination of the first value and the second value indicates whether the scheduling of transmission opportunities in which contention is restricted based on the time is available or not, and indicates a scheduling scheme in a case where the scheduling of transmission opportunities in which contention based on the time is restricted is available.

5. The communication apparatus according to claim 1, wherein when transmitting the radio frame including the information concerning the scheduling of transmission opportunities in which contention is restricted based on the time, based on an application that performs communication using transmission opportunities in which contention is restricted based on the time, the communication apparatus sets the information concerning the scheduling of low latency data communication based on the time.

6. The communication apparatus according to claim 1, wherein the information concerning the scheduling of transmission opportunities in which contention is restricted based on the time is transmitted to the other communication apparatus or received from the other communication apparatus before connection to the other communication apparatus is established.

7. The communication apparatus according to claim 1, wherein the information concerning the scheduling of transmission opportunities in which contention is restricted based on the time indicates scheduling for transmitting or receiving a data frame to or from the other communication apparatus.

8. The communication apparatus according to claim 7, wherein the information concerning the scheduling of transmission opportunities in which contention is restricted based on the time includes a scheme to be used to transmit or receive the data frame, which is set based on a scheme of the scheduling of transmission opportunities in which contention is restricted based on the time that can be used by the other communication apparatus and a scheme of the scheduling of transmission opportunities in which contention is restricted based on the time that can be used by the communication apparatus.

9. The communication apparatus according to claim 1, wherein if the communication apparatus cannot use a scheme of the scheduling of transmission opportunities in which contention is restricted based on the time that can be used by the other communication apparatus, the information concerning the scheduling based on the time includes information indicating that the scheduling of transmission opportunities in which contention is restricted based on the time cannot be used.

10. The communication apparatus according to claim 1, wherein the other communication apparatus is an access point apparatus, and
after the radio frame including information relating to the scheduling of transmission opportunities in which contention is restricted based on the time is transmitted to the access point apparatus, in a case where a schedule determined by the access point apparatus is received from the access point apparatus, the communication apparatus transmits a data frame based on the received schedule.

11. A control method executed by a communication apparatus operating as an access point, comprising:
transmitting a radio frame complying with an IEEE802.11 be standard to another communication apparatus,
wherein a MAC (Media Access Control) frame of the radio frame transmitted includes an information element indicating whether the communication apparatus supports a scheme of scheduling of transmission opportunities in which contention is restricted based on a time to perform a low-latency communication,
wherein the radio frame including the MAC frame including the information element indicating whether the communication apparatus supports the scheme of scheduling of the transmission opportunities is one of a Beacon frame a Probe Response frame, an Association Response frame, and a Reassociation Response frame.

12. A non-transitory computer-readable storage medium that stores a program for causing a computer included in a communication apparatus to:
transmit a radio frame complying with an IEEE802.11 be standard to another communication apparatus,
wherein a MAC (Media Access Control) frame of the radio frame transmitted includes an information element indicating whether the communication apparatus supports a scheme of scheduling of transmission opportunities in which contention is restricted based on a time to perform a low-latency communication,
wherein the radio frame including the MAC frame including the information element indicating whether the communication apparatus supports the scheme of scheduling of the transmission opportunities is one of a Beacon frame a Probe Response frame, an Association Response frame, and a Reassociation Response frame.

* * * * *